3,402,210
PRODUCTION OF 1-NAPHTHOL
Robert D. Hiser, Charleston, W. Va., assignor to Union Carbide Corporation, a corporation of New York
No Drawing. Filed Jan. 20, 1964, Ser. No. 338,563
4 Claims. (Cl. 260—621)

This invention relates to a novel catalytic process for producing 1-naphthol and to a catalyst therefor. More particularly, this invention relates to an improved process for the conversion of 3,4-dihydro-1(2H)-naphthaleneone to 1-naphthol and a catalyst therefor.

A convenient method for the production of 1-naphthol comprises the catalytic vapor phase dehydrogenation of 3,4-dihydro-1-(2H)-naphthaleneone to 1-naphthol. The most desirable catalyst for effecting the dehydrogenation are platinum catalysts because of their resistance to poisoning by sulfur or chlorine and their long life at the elevated temperatures necessary for good yields of 1-naphthol. The platinum catalyst of the prior art suffer from one main drawback, however; they are incapable of promoting a sufficiently high degree of conversion of 3,4-dihydro-1-(2H)-naphthaleneone to 1-naphthol to be commercially useful. The reaction product generally comprises a mixture of naphthol and 3,4-dihydro-1-(2H)-naphthaleneone which, because these components form a maximum-boiling azeotrope which boils at a temperature about 5° C. above the boiling point of naphthol, precludes distillation as a means of recovering the 1-naphthol.

Thus, other methods, such as crystallization of the naphthol from a hydrocarbon such as heptane are employed to recover the naphthol. It has been found, however, that for the dehydrogenation and subsequent crystallization to be commercially feasible, the weight ratio of naphthol to 3,4-dhydro-1-(2H)-naphthaleneone in the dehydrogenation product must be at least 4:1. A catalyst consisting of platinum alone on a suitable support material is incapable of maintaining the high degree of conversion necessary to achieve this ratio for a sufficient length of time to permit its use in a commercial process.

It has been found by this invention that if the platinum catalyst contains a small amount of neodymium the yields and efficiency of the process are increased and the catalyst life is greatly prolonged.

The catalysts of this invention are generally comprised of platinum metal and an inorganic neodymium compound on a support material. The amount of platinum can vary from about 0.25 weight percent to about 5 weight percent. Amounts of from 0.9 to 1.25 weight percent platinum are preferred because, at smaller amounts the catalyst cannot be reactivated satisfactorily, and there is no increase in catalytic activity or life with larger amounts.

The amounts of neodymium employed can vary from 0.25 to 1.5 weight percent. It is preferred, however, to employ from about 0.6 to about 0.8 weight percent because of the outstanding superiority of such catalysts. The neodymium is present in the form of an ionic compound, such as neodymium oxide, neodymium chloride, neodymium sulfate and the like.

Any suitable support material can be employed, such as activated carbon, silica, alumina, asbestos, aluminum silicates, and the like.

The catalyst can be prepared in any convenient manner. A preferred method comprises admixing an aqueous solution of chloroplatinic acid and one or more inorganic neodymium compounds, preferably neodymium chloride, with a support material and drying at elevated temperatures to remove water. The catalyst is activated by reduction in any suitable manner, such as by passing hydrogen gas through a bed of the catalyst at a temperature in excess of about 250° C., and preferably at about 375° C. for 16 hours.

The process of this invention comprises contacting in the vapor phase a feed containing 3,4-dihydro-1-(2H)-naphthaleneone with the reduced catalyst under conditions sufficient to effect the dehydrogenation and to produce a product wherein the weight ratio of 1-naphthol to 3,4-dihydro-1-(2H)-naphthaleneone is at least 4:1.

In general the temperature at which the dehydrogenation is conducted can vary from about 250° C. to about 450° C., with temperatures of from about 350° C. to about 400° C. preferred. At temperatures below 250° C., for example about 225° C., the feed will not remain vaporized and may leach out the neodymium salts in the catalyst, and thereby deactivate the catalyst. At temperatures greater than 450° C., for example about 500° C., coke formation is accelerated to such an extent that complete and irreversible deactivation of the catalyst occurs.

The pressure at which the dehydrogenation is effected is not particularly critical, although extremely high pressures will hinder the dehydrogenation. The reaction proceeds readily at or slightly above atmospheric pressure, however, and, thus, these pressures are normally employed.

Although not necessary, it is desirable to feed the tetralone to the reaction in admixture with hydrogen gas to assist in vaporization of the feed and to prolong catalyst life. The amount of hydrogen is not narrowly critical, and amounts of from about 0.5 to about 15 moles of hydrogen per mole of feed can be employed. Optimum amounts are from about 2:1 to about 6:1.

The rate of feed of the 3,4-dihydro-1-(2H)-naphthaleneone to the reaction can vary from about 0.3 to about 5 or more liters per liter of catalyst bed per hour, with feed rates of from about 0.4 to about 1.0 l./l./hr. being preferred. For maximum efficiency of the dehydrogenation, the feed rate should be the maximum rate at which a naphthol/3,4-dihydro-1-(2H)-naphthaleneone weight ratio of above 4:1 can be obtained, which will decrease during the life of the catalyst. It is preferred that, when the desired naphthol/3,4-dihydro-1 - (2H) - naphthaleneone weight ratio of 4:1 cannot be maintained at a feed rate of at least 0.4 l./l./hour, the catalyst be reactivated, because the rate of production of 1-naphthol is too low at lower feed rates for a commercial process.

The catalyst is reactivated by flushing the catalyst bed with nitrogen or other inert gas to remove hydrogen, followed by an oxidation to burn off carbon deposits on the catalyst by blowing air diluted with nitrogen through the catalyst bed until the amount of carbon dioxide in the off-gas falls to about 0.5 volume percent. Since this reaction is exothermic, it is preferred that the oxygen content of the oxidizing gas be below about 2 volume percent, at least in the early stages, to ensure against destruction or deactivation of the catalyst.

After oxidation the catalyst bed is purged with nitrogen or other inert gas to remove oxygen, and then the catalyst is activated as previously described.

The following examples are illustrative of this invention. In these examples the percent yield and efficiency were calculated by the following equations:

$$\text{Percent yield} = \left(\frac{A}{B}\right) \times 100$$

$$\text{Percent efficiency} = \left(\frac{A}{B-C}\right) \times 100$$

wherein A is the difference between the mole percent of 1-naphthol in the product and feed streams; B is the total mole percent of 3,4-dihydro-1-(2H)-naphthaleneone in the feed; and C is the total mole percent of 3,4-dihydro-1-(2H)-naphthaleneone in the product stream.

EXAMPLE 1

To a solution of 1.39 gram of neodymium chloride ($NdCl_3 \cdot 6H_2O$) in 30 grams of water, was added a solution of 1.88 gram of chloroplatinic acid ($H_2PtCl_6 \cdot 6H_2O$) in 10 grams of water. The resulting solution was admixed with 75 grams of particulate activated alumina. After drying for 3 hours on a steam bath the mixture was charged to a ¾-inch diameter by 40-inch long reactor, heated to 375° C. and reduced by passing hydrogen gas through the bed at a rate of 10 liters per hour for 16 hours.

The reduced catalyst was employed to dehydrogenate at 375° C. a feed consisting of 72 weight percent 3,4-dihydro-1-(2H)-naphthaleneone, 26 weight percent 1-naphthol, 1.0 weight percent 1,2,3,4-tetrahydro-1-naphthol and 0.7 weight percent hydrocarbons, in admixture with hydrogen in a mole ratio of hydrogen to feed of 3:1. The feed rate was 0.8 liters per liter of catalyst bed per hour. The dehydrogenation was run for 125 hours at which time the naphthol/3,4-dihydro-1-(2H)-naphthaleneone ratio fell to below 4:1 and the experiment was terminated. The maximum yield of 1-naphthol was 84 percent at an efficiency of 88 percent, and the average yield was 76.3 percent at an efficiency of 87.5 percent. Employing a similar catalyst, except that the neodymium chloride was omitted, 1-naphthol was obtained in an average yield of only 71 percent at an average efficiency of only 79 percent. The life of this catalyst was only 50 hours.

EXAMPLE 2

Employing apparatus, materials and procedures similar to those described in Example 1, except that the catalyst contained 0.75 weight percent neodymium in the form of its chloride and no platinum, on an alumina support, an attempt was made to dehydrogenate a feed consisting of essentially pure 3,4-dihydro-1-(2H)-naphthaleneone at 375° C. and feed rates of 400, 600 and 800 ml./l./hr. The results of these runs are summarized in tabular form below.

| Feed Rate, ml./l./hr. | Product | | |
|---|---|---|---|
| | 1-naphthol, wt. percent | 3,4-dihydro-1-(2H)-naphthaleneone, wt. percent | Naphthalene, wt. percent |
| 400 | 5.5 | 72.8 | 21.7 |
| 600 | | 95.6 | 4.4 |
| 800 | | 95.7 | 4.3 |

From the above data it can be readily seen that alumina-supported neodymium was a very poor dehydrogenation catalyst for the preparation of 1-naphthol from 3,4-dihydro-1-(2H)-naphthaleneone and, at the higher feed rates, was primarily a dehydrating catalyst.

What is claimed is:
1. The method for producing 1-naphthol which comprises heating at 250° C. to 450° C. a mixture of hydrogen gas and 3,4-dihydro-1-(2H)-naphthaleneone in contact with a catalyst composition consisting essentially of a support material, from 0.25 to 5 weight percent platinum metal and from 0.25 to 1.5 weight percent neodymium in the form of an inorganic compound.

2. The process as claimed in claim 1 wherein said inorganic compound is neodymium chloride.

3. The method for producing 1-naphthol which comprises heating at 350° C. to 400° C. a mixture of hydrogen gas and 3,4-dihydro-1-(2H)-naphthaleneone in contact with a catalyst composition consisting essentially of a support material, from 0.9 to 1.25 weight percent platinum metal and from 0.6 to 0.8 weight percent neodymium in the form of an inorganic compound.

4. The process as claimed in claim 3 wherein said inorganic compound is neodymium chloride.

References Cited
UNITED STATES PATENTS 2,337,191  12/1943  Greensfelder et al. __ 252—462 X
2,503,641   4/1950  Taylor et al. _____ 260—621
2,814,599  11/1957  Lefrancois et al. ____ 252—441 X LEON ZITVER, *Primary Examiner.*

H. ROBERTS, *Assistant Examiner.*